United States Patent Office 2,805,225
Patented Sept. 3, 1957

2,805,225

NEW ANTHRONE DERIVATIVES AND PROCESS FOR THEIR MANUFACTURE

Paul Grossmann, Binningen, and Walter Jenny, Reinach, near Basel, Switzerland, assignors to Ciba Limited, Basel, Switzerland No Drawing. Application August 15, 1955, Serial No. 528,537

Claims priority, application Switzerland August 20, 1954

5 Claims. (Cl. 260—298)

This invention provides new anthrone derivatives which correspond to the general formula:

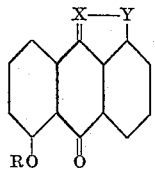

in which R represents a hydrogen atom or an aliphatic acyl radical of low molecular weight, X represents a nitrogen atom or the group —CH=, and Y represents a

or

group or a sulfur or selenium atom.

The invention also provides a process for the manufacture of the above new anthrone derivatives, wherein an anthrone which corresponds to the general formula:

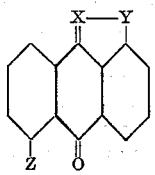

in which X represents a nitrogen atom or the —CH= group, Y represents

or

group or a sulfur or selenium atom, and Z represents a substituent convertible into a hydroxyl group, is reacted with an agent capable of converting the substituent Z into a hydroxyl group, and, if desired, the hydroxyanthrone so obtained is acylated with an agent capable of introducing the radical of an aliphatic monocarboxylic acid of low molecular weight.

Of the above defined anthrones which may be used as starting material some are known and others can be made by methods in themselves known. Examples are 5-amino-1:9-isothiazole-anthrone, 5-amino-1:9-isoselenazole-anthrone, 5-amino-1:9-pyrazole-anthrones, for example, 5-amino-N-methyl-1:9-pyrazole-anthrone, or 5-amino-1:9-thiophenanthrone.

The invention also provides an alternative process for making the above new anthrone derivatives, wherein a 5-hydroxyanthraquinone, which contains in the 1-position a reactive substituent, for example, a halogen atom or a sulfonic acid, sulfo chloride, amino, hydrazino, mercapto, thiocyano or selenocyano group, is reacted with an agent capable of bringing about the formation of a 5-membered heterocyclic ring fused on in the 1:9-position, and, if desired, acylating the hydroxyanthrone so obtained. For example, by reacting a 1 halogen-5-hydroxyanthraquinone with hydrazine or an alkyl-hydrazine, 5-hydroxypyrazoleanthrone or its N-alkyl-derivative is obtained. 5-hydroxypyrazole-anthrone can also be obtained by diazotizing 1-amino-5-hydroxyanthraquinone, reducing the diazocompound to the 1-hydrazino-5-hydroxyanthraquinone, and subjecting the latter to ring closure. By the action of sodium polysulfide and ammonia upon 1-chloro-5-hydroxyanthraquinone, 5-hydroxy-isothiazole-anthrone is obtained, and by reacting 1 mercapto-5-hydroxyanthraquinone with chloracetic acid in an alkaline medium the corresponding mercapto-acetic acid is obtained, which when subjected to a known method for bringing about ring closure accompanied by the splitting off of carbon dioxide yields 5-hydroxy-1:9-thiophenanthrone.

The 5-hydroxyanthrones of this invention may be acylated by means of an agent capable of introducing the radical of an aliphatic monocarboxylic acid of low molecular weight, and advantageously the radical of a carboxylic acid containing 2 to 4 carbon atoms.

The new anthrone derivatives of this invention, which correspond to the formula given above, and especially, 5-hydroxy-isothiazole-anthrone, are suitable, especially after a suitable pasting treatment which may be coupled with precipitation, for example, from sulfuric acid, for dyeing or printing hydrophobic fibrous materials, for example, those of cellulose esters, super polyamides or super polyurethanes, and above all polyethylene terephthalate fibers, which are known under the trade names "Terylene" and "Dacron." In this manner pure strong yellow tints of excellent fastness to light are obtained. A few of the new dyestuffs possess the remarkable property that the fastness to light of their dyeings on polyethylene terephthalate fibers remain substantially unimpaired even when the dyeing is carried out in a bath containing a swelling agent.

The following examples illustrate the invention, the parts and percentages being by weight.

Example 1

12.6 parts of 5-amino-isothiazole-anthrone are dissolved in 150 parts of sulfuric acid of 95% strength, and mixed with 115 parts of water at 20–30° C., and then 3.75 parts of sodium nitrite dissolved in 37.5 parts of sulfuric acid of 95% strength are added drop-wise at 20–30° C. 220 parts of water are added and the whole is heated to 95–100° C., whereupon the 5-hydroxy-isothiazole-anthrone precipitates in the form of fine crystals. When a filtered test portion no longer yields a precipitate on boiling, the whole is poured into 500 parts of water, filtered, and the filter residue is washed neutral. The dyestuff so obtained dissolves in organic solvents with a yellow coloration and dyes Terylene after being suitably converted into a fine dispersion pure, greenish yellow, strong tints of excellent fastness to light.

Example 2

12.6 parts of 5-amino-thiophenanthrone are diazotized and converted into 5-hydroxy-thiophenanthrone in the manner described in Example 1. There is obtained an olive colored powder, which dissolves in sulfuric acid with a bluish red coloration and in organic solvents with a yellow coloration. After being suitably pasted it dyes cellulose acetate artificial silk yellow tints.

Example 3

12 parts of 5-hydroxy-1-chloranthraquinone in the form of 32 parts of an aqueous paste are heated for 12 hours at 120–125° C. in a stirring autoclave with 55 parts of water, 25 parts of sodium sulfide of 60% strength, 10 parts of sulfur and 50 parts of ammonia solution of 25% strength. The precipitated dyestuff is filtered off in the cold, washed free from sulfide ions by means of a sodium bicarbonate solution of 3% strength, the dyestuff is then suspended in water, acidified with hydrochloric acid and washed neutral. The dyestuff so obtained is identical with that described in Example 1.

*Example 4*

12 parts of 5-hydroxy-anthraquinone-1-sulfonic acid (potassium salt) in 66 parts of water are heated for 12 hours at 125–130° C. in a stirring autoclave with 5 parts of sulfur, 18 parts of ammonia solution of 25% strength and 26 parts of sodium sulfide of 60% strength. The dyestuff is isolated as described in Example 3. The dyestuff so obtained is identical with that described in Example 1.

*Example 5*

10 parts of 5-methoxy-1:9-isothiazo-anthrone are heated in 100 parts of sulfuric acid of 85% strength for 1 hour at 140° C. When cold, the mixture is poured into ice water, filtered and the filter residue is washed neutral. The dyestuff so obtained is identical with that described in Example 1.

*Example 6*

31 parts of 1-hydroxy-anthraquinone-5-selenocyanide and 380 parts of ammonia solution of 22% strength are heated in a closed vessel for 5 hours at 150–160° C. The cooled mass is filtered, and the filter residue is washed neutral with hot water and dried. By crystallisation from glacial acetic acid with the addition of animal carbon the dyestuff is obtained in the form of yellow needles, which melt at 225° C. After being converted into a fine dispersion, the dyestuff so obtained dyes cellulose acetate silk and Terylene strong yellow tints of excellent fastness to light. The dyestuff has the formula:

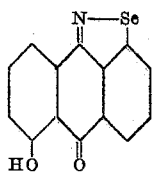

1-hydroxyanthraquinone-5-selenocyanide is obtained by one of the usual methods from 1-hydroxy-5-aminoanthraquinone by diazotization and reaction of the diazonium salt with potassium selenocyanide. It crystallizes from anisol in yellow crystals.

*Analysis.*—Calculated N=4.27%, found N=4.32%.

*Example 7*

5 parts of 5-hydroxy-1:9-isothiazole-anthrone and 5 parts of anhydrous sodium acetate are boiled under reflux in 100 parts by volume of acetic anhydride for 4½ hours. After being poured into cold water, the reaction mass is filtered with suction, and the residue is washed well with water and dried. By recrystallization from glacial acetic acid there is obtained the dyestuff of the formula:

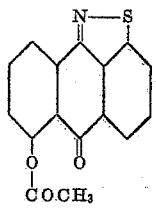

in the form of pale yellow crystals, which melt at 214° C. (calculated N=4.74%, found N=4.71%). After being converted into a fine suspension the dyestuff so obtained dyes cellulose acetate silk and Terylene strong greenish yellow tints of excellent fastness to light.

*Example 8*

50 parts of 5-amino-N-methyl-1:9-pyrazole-anthrone are dissolved at room temperature in 250 parts of concentrated sulfuric acid, and diazotized at 0–10° C. with a nitrosyl sulfuric acid prepared from 15 parts of sodium nitrite and 10 parts of concentrated sulfuric acid. After stirring the mixture for 4 hours at room temperature, 400 parts of water are added, while stirring, and the whole is stirred at the boil for 1 hour, then filtered with suction, and the filter residue is washed neutral and dried at 60° C. By recrystallization from chlorobenzene there is obtained the dyestuff of the formula:

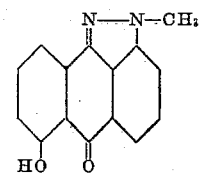

in the form of orange crystals, which melt at 234° C. (calculated N=11.20%, found N=11.17%). After being converted into a fine dispersion, the dyestuff so obtained dyes cellulose acetate silk and Terylene strong gold yellow tints.

*Example 9*

1.6 parts of the dyestuff obtained as described in Example 1 are dissolved at 0° C. in 30 parts of sulfuric acid of 90% strength, the solution is poured on to ice and water, and then filtered. The filter cake obtained is ground in a roller mill with 1 part of dried sulfite cellulose waste liquor.

100 parts of a fibrous material of Terylene are given a preliminary cleansing treatment in a bath which contains, in 1,000 parts of water, 1–2 parts of the sodium salt of N-benzyl-μ-heptadecyl-benzimidazole-disulfonic acid and 1 part of a concentrated aqueous solution of ammonia. The material is then pre-swelled for ½ hour at 80° C. in a dye bath which contains in 3,000 parts of water 15 parts of a mixture of approximately equal parts of ortho-hydroxydiphenyl, pine oil and Turkey red oil and 15 parts of acetic acid. The bath is then allowed to cool to 50° C., and the dyestuff paste obtained as described in the preceding paragraph is added. The bath is raised to the boil in the course of ½ to ¾ of an hour, and dyeing is continued for 1 to 1½ hours as close as possible to the boiling temperature. The material is then rinsed well, and, if desired, washed for ½ an hour at 60–80° C. with a solution which contains in 1,000 parts of water 1 part of the sodium salt of N-benzyl-μ-heptadecyl-benzimidazole-disulfonic acid. There is obtained a strong greenish yellow dyeing.

What is claimed is:

1. An anthrone derivative which corresponds to the formula

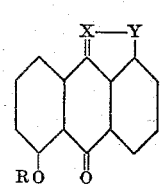

in which R represents a member selected from the group consisting of a hydrogen atom and an acyl radical of an aliphatic monocarboxylic acid having at most 4 carbon atoms, X represents a member selected from the group consisting of a nitrogen atom and a —CH= group, and Y represents a member selected from the group consisting of an —NH— and an

—N—CH$_3$ group, a sulfur atom and a selenium atom.

2. The anthrone derivative of the formula
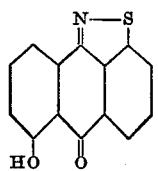
3. The anthrone derivative of the formula
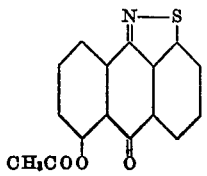
4. The anthrone derivative of the formula
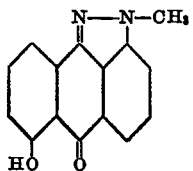
5. The anthrone derivative of the formula
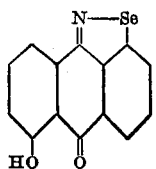
References Cited in the file of this patent
UNITED STATES PATENTS
| | | |
|---|---|---|
| 2,113,236 | Lulek et al. | Apr. 5, 1938 |
| 2,162,201 | Perkins | June 13, 1939 |
| 2,715,128 | Grossmann et al. | Aug. 9, 1955 |